United States Patent
Dykstra et al.

(10) Patent No.: US 6,360,408 B1
(45) Date of Patent: Mar. 26, 2002

(54) HOOKED LATCH WITH BALL LOCK SLIDING SLEEVE RETAINER

(76) Inventors: Penelope Rae Dykstra, 1740 W. Kanai, Porterville, CA (US) 93257; Molly Jo Moses, 23322 Evalyn, Torrance, CA (US) 90505

( * ) Notice: Subject to any disclaimer, the term of this patent is extended or adjusted under 35 U.S.C. 154(b) by 0 days.

(21) Appl. No.: 09/515,701

(22) Filed: Feb. 29, 2000

(51) Int. Cl.[7] ............................................... F16G 11/00
(52) U.S. Cl. .................. 24/598.7; 24/115 G; 24/115 L; 24/598.5
(58) Field of Search ............................ 24/598.7, 598.5, 24/598.8, 136 A, 115 G, 115 L, 600.2, 601.1, 610, 71 J (56) References Cited

U.S. PATENT DOCUMENTS

| | | | |
|---|---|---|---|
| 1,299,821 A | * 4/1919 | Carpmill et al. | 24/598.5 |
| 1,826,564 A | * 10/1931 | Mix | 24/598.5 |
| 3,859,693 A | 1/1975 | Breed | 24/241 SL |
| 3,952,382 A | * 4/1976 | Vaage | 24/598.5 |
| 4,073,042 A | 2/1978 | Miller | |
| 4,075,966 A | 2/1978 | Bates | |
| 5,002,420 A | 3/1991 | Loyd | |
| 5,156,430 A | * 10/1992 | Mori | 294/82.23 |
| 5,305,503 A | * 4/1994 | Yamagata | 24/265 WS |
| 5,323,514 A | * 6/1994 | Masuda et al. | 24/115 G |
| 5,430,914 A | * 7/1995 | Patterson et al. | 24/598.5 |
| 5,860,198 A | 1/1999 | Buntin | |
| 5,867,877 A | * 2/1999 | Patterson et al. | 24/598.5 |

* cited by examiner

Primary Examiner—Victor N. Sakran (57) ABSTRACT

An improved hook latch mechanism, for use with cordage loops, used for leashes, cables, ropes, rigging or like restraining devices having a center body hook with a sliding outer sleeve to cover and uncover the hook opening. A spring loaded ball locking device is employed to lock the sliding sleeve in position to cover the hook opening to thus prevent the cordage loops from slipping off the hook, depressing the ball inwardly against a spring and sliding the sleeve upwardly to uncover the hook opening, permitting the removal of the cordage loop. A swiveling bail link at the other end of hook prevents twisting of the cordage loop.

4 Claims, 7 Drawing Sheets

HOOKED LATCH WITH BALL LOCK SLIDING SLEEVE RETAINER

BACKGROUND—FIELD OF INVENTION

This invention relates to a hook latch mechanism used to attach various cordage loops such as leashes, cables, ropes, rigging or like restraining devices; a protective sleeve covers the hook opening to prevent slippage of the cordage loop off the hook, wherein a spring loaded ball detent lock arrangement is employed to lock the sleeve over the hook opening preventing the cordage loop from slipping off the hook. The sleeve is quickly moved from the hook opening by depressing the ball lock, while simultaneously sliding the sleeve to uncover the hook opening to remove the cordage loop.

BACKGROUND—DESCRIPTION OF PRIOR ART

Hook latches or like devices come in various sizes and configurations and are used in numerous applications to connect various cordage. Means of retaining the cordage loop onto the hook to prevent slippage, are spring loaded pivot retainers which bridge the hook opening, leaf spring retainers fastened at one end and butted up against the hook point to bridge the hook opening, bolted retainers which bridge the hook opening, spring loaded sliding pins used to bridge opening, locking chain links to bridge the hook opening, and short steel cables with I-bolts used to bolt the cable across the hook opening.

Hook latches require various methods of removing the bridge across the hook opening, and in some cases these retainer bridges interfere with the cordage loop making it difficult to remove the hoop from the hook. In the leaf spring concept, the leaf spring must be depressed out of the way, to remove the cordage loops off the hook, thus requiring both hands to accomplish the task. The bolt on type retainer bridge require that the bolts be removed before the bridge across the hook is removed.

Our invention provides a means to easily install and remove the cordage loop from the hook by depressing two ball detent while sliding the sleeve away from the hook opening, to remove or install cordage loop. The sliding cylindrical bridge is fitted to external surface of the cylindrical hook body and is easily slid away from the hook opening.

SUMMARY

Our new hook latch ball sliding sleeve retainer is designed for adaptation on all existing hook latch devices used in the industry, and can be easily retrofitted.

The general object of our invention is to secure various cordage loops over the hook latch from slipping off with the use of the ball lock sliding sleeve retainer, and to provide a quick, and safe means of disengaging the sleeve from the hook opening. The hook latch consists of six basic parts, comprising a swivel yoke (bail) permanently attached to the main cylindrical body of the lifting hook by a threaded means. A cylindrical sleeve fitted closely to the round body of the hook to cover the hook opening of said cordage loop. Two steel balls loaded by a singular compression spring engages the holes provided in the cylindrical sleeve to lock said sleeve to the said main cylindrical body of the lifting hook to cover the hook opening thus preventing slippage of the cordage loop off of the hook. A groove imbedded along the axis of the hook body provides a means to guide the sleeve and maintain alignment of the sleeve with the hook body, and ball locking mechanism.

By depressing the said locking balls manually to disengage said balls from the holes in said cylindrical sleeve and in the same motion sliding the cylindrical sleeve away from the hook opening the cordage loop may be lifted off the hook.

OBJECTS AND ADVANTAGES

Accordingly, a number of objectives and advantages of our invention follows.

To provide a means of sliding the said cylindrical sleeve covering the hook opening to remove the cordage loop without interference from the said sleeve. Prior art requires that the spring loaded hook covering be held away from the hook opening with one hand while attempting to remove the cordage loop from the hook.

To provide a means of inserting the cordage loop onto the hook opening free of encumbrances as used in prior art such as hook shackles, spring loaded pivoting hook bridges to cover the hook opening, bolted hook opening bridges, and chains to cover the hook opening, and like methods.

To provide a sure lock of the cylindrical sleeve over the hook opening with the spring ball lock arrangement used to prevent the cordage loop from slipping off the hook.

To provide a means to quickly slide said cylindrical sleeve away from the hook opening to remove the cordage loop from the hook regardless of the tension applied on the cable. The cylindrical sleeve is independent of the tension on our hook latch invention, and is permanently held in position onto the said cylindrical hook body by means of a groove and detent arrangement, which further prevents rotation of the cylindrical cylinder with respect to the said cylindrical body.

To provide a swivel means of the bail shackle to permit the hook assembly to rotate freely without twisting the cable.

Further objectives and advantages of our invention will become apparent from the considerations of the drawing and the ensuing description.

DRAWINGS FIGURES

In the drawings, which form part of the specification, closely related figures have the same number but different alphabetic suffixes.

REFERENCE NUMERALS IN DRAWINGS

1. Latch assembly
2. Hook center Body
3. Cordage loop
4. Cordage loop
5. Hook
6. —
7. —
8. Hole 8 and 8'
9. Centerline
10. —
11. Slot
12. Slot end surfaces
13. —
14. Threaded hole
15. —
16. —
17. Sliding sleeve
18. —
19. —
20. Hole 20 and 20'
21. —
22. —
23. Centerline
24. —
25. —
26. Assembly centerline
27. Dimple
28. —
29. Sleeve body
30. Distance "x"
31. —
32. Bail link
33. —
34. —
35. Shoulder bolt
36. Bolt shoulder
37. Gap
38. Bolt threads
39. Face
40. Cable
41. Hook opening
42. —
43. —
44. Inner diameter
45. —
46. Stop
47. —
48. Scalloped
49. —
50. Width "Y"

DESCRIPTION OF INVENTION

Figure 1:
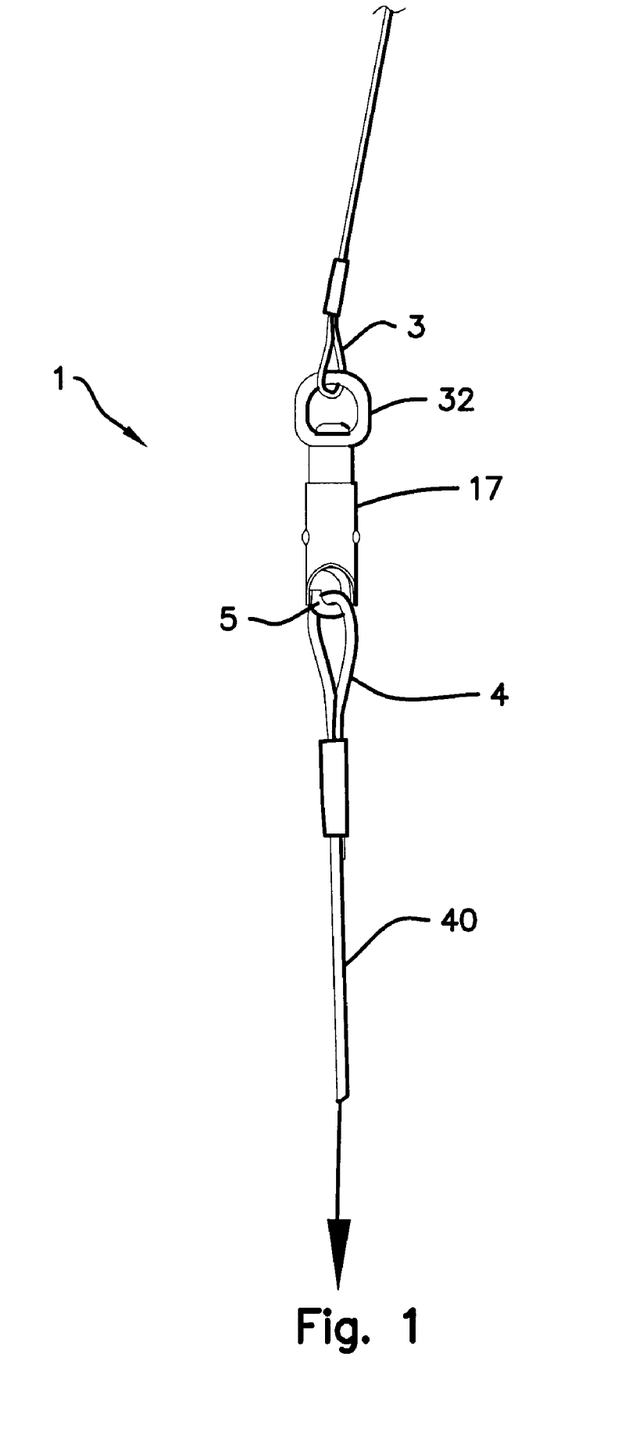
FIG. 1 shows an elevation view of our invention suspended by a cable, and loaded with a dead weight.

FIG. 1—Preferred Embodiment

A preferred embodiment of our present hooked latched with ball lock sliding sleeve retainer in use as illustrated in FIG. 1. The latch assembly 1 is shown with leash cordage loop 3 attached to bail 32 with the lift cordage loop 4 attached to hook 5 with sleeve 29 in the locked position with balls 15 and 15'.

Figure 2:
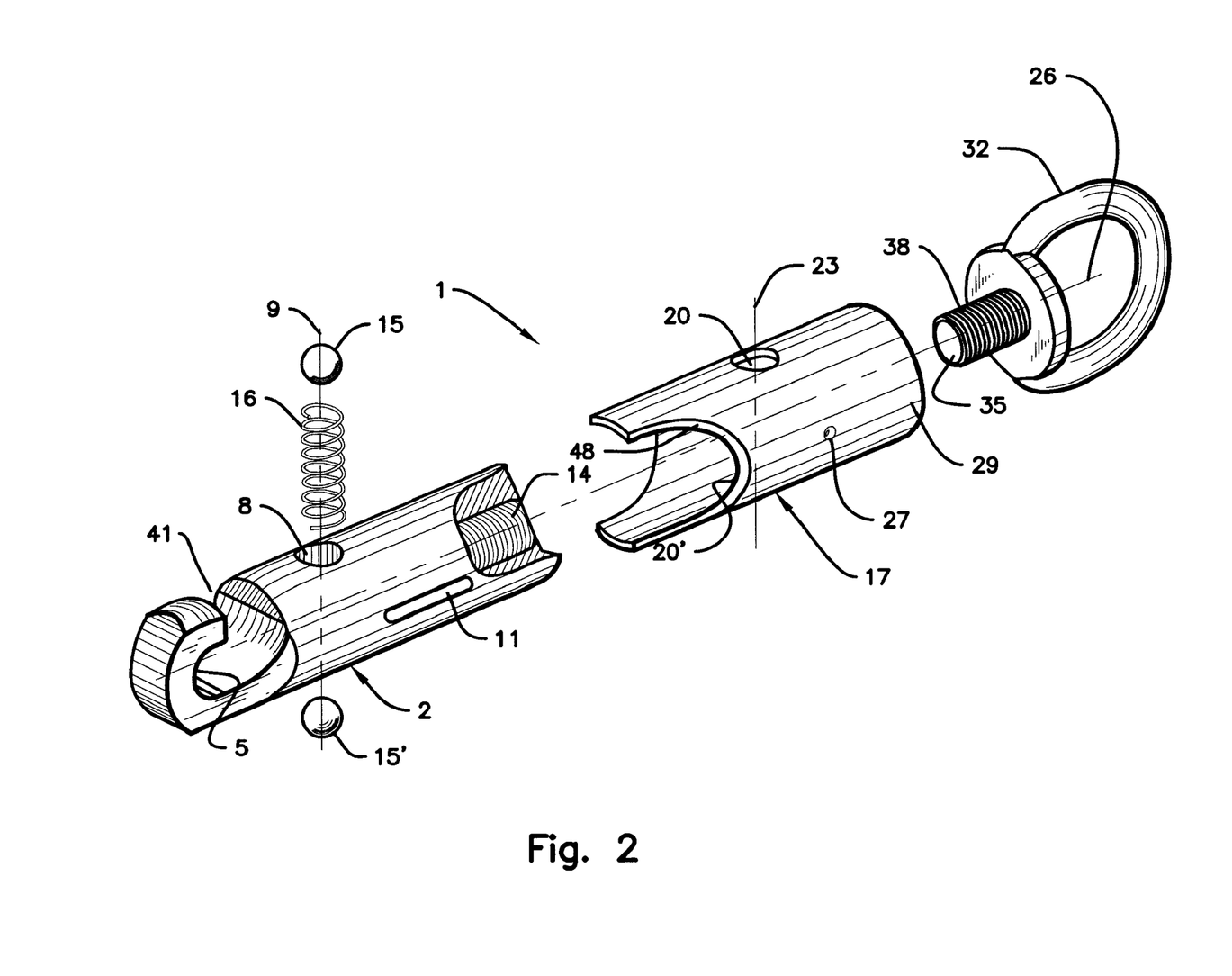
FIG. 2 shows an exploded view showing the detail components of the invention.

FIG. 2—Additional Embodiment

Additional embodiment of our invention as illustrated in FIG. 2 is an exploded isometric view of the Hook Latch With Ball Lock Sliding Sleeve Retainer showing several detail components which make up the assembly 1.

The main cylindrical body 2 consists of a solid round metallic bar with a manufactured hook 5 at one end, a through hole 8 with its center line 9 perpendicular to the center line 26 of the assembly 1, a single longitudinal slot 11 placed parallel to the center line 26 of assembly 1, and a threaded hole 14 located opposite to the hook 5 end at the top of body 2.

A sliding cylindrical sleeve 17, consisting hole 20 and hole 20' are positioned inline on a common center line 23, positioned perpendicular to the center line 26 of the assembly 1. Holes 20 and 20' will be aligned with holes 8 in body 2 when sleeve 17 is slid over body 2 when assembled. In this hole alignment position, center line 8 on body 2, and center line 23 on the sliding sleeve are coincident. A depression or dimple 27 on the sleeve body 29, positioned at a right angle to the center line 23, acts as a guide and rides in slot 11 as sleeve 17 slides back and forth during the operation of the assembly 1.

A steel compression spring 16 fits into hole 8 with steel balls 15 and 15' placed on each end of the spring 16 for locking purposes.

A bail link 32 is retained to body 2 with bolt 35 by threading bolt threads 38 into threaded hole 14.

Figure 3:
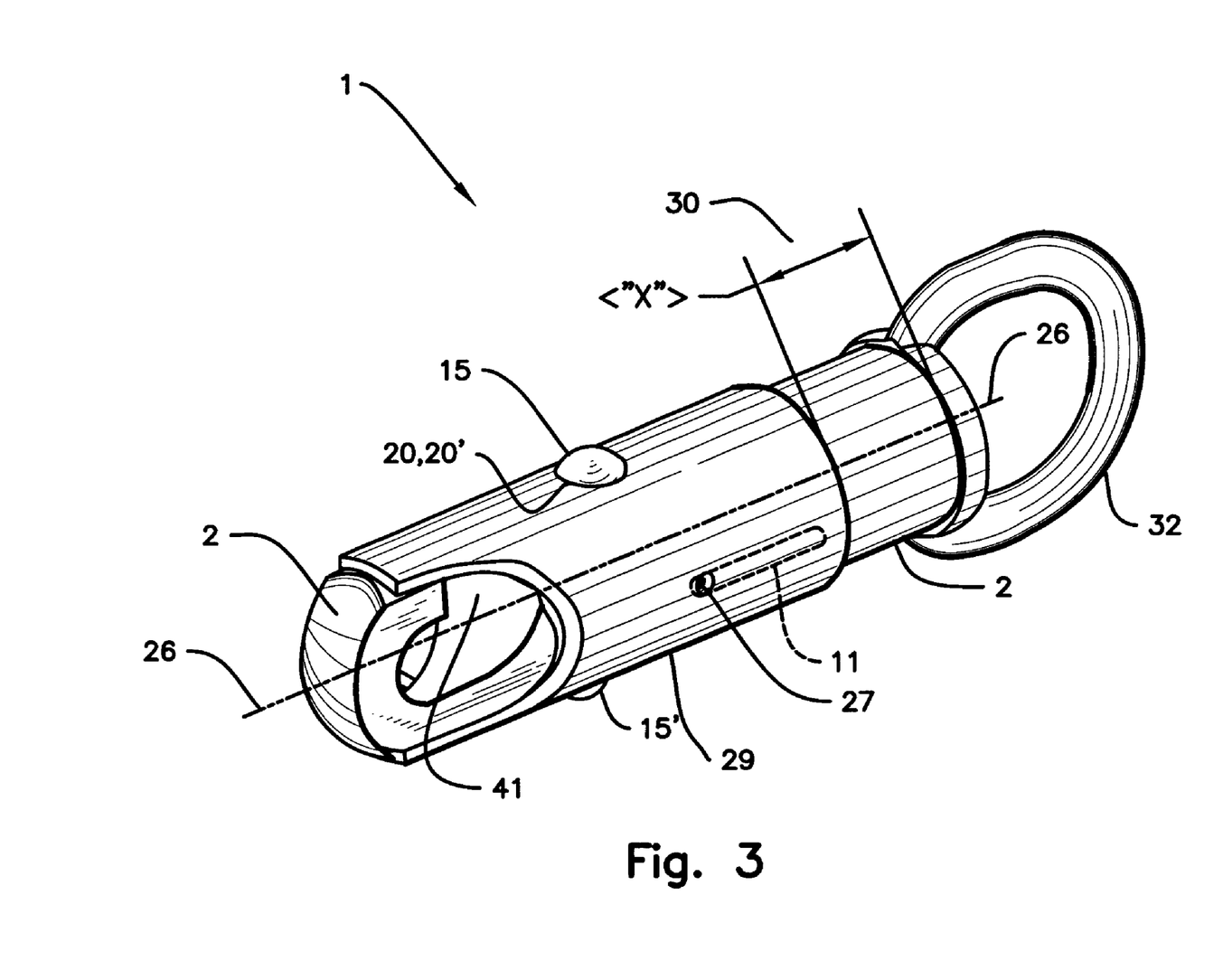
FIG. 3. is an enlarged isometric view showing the latch assembly 1 in the closed position with the sleeve covering the hook opening, and the locking balls engaged in the sleeve.

FIG. 3—Assembly Embodiment In Locked and Closed Position

Figure 6:
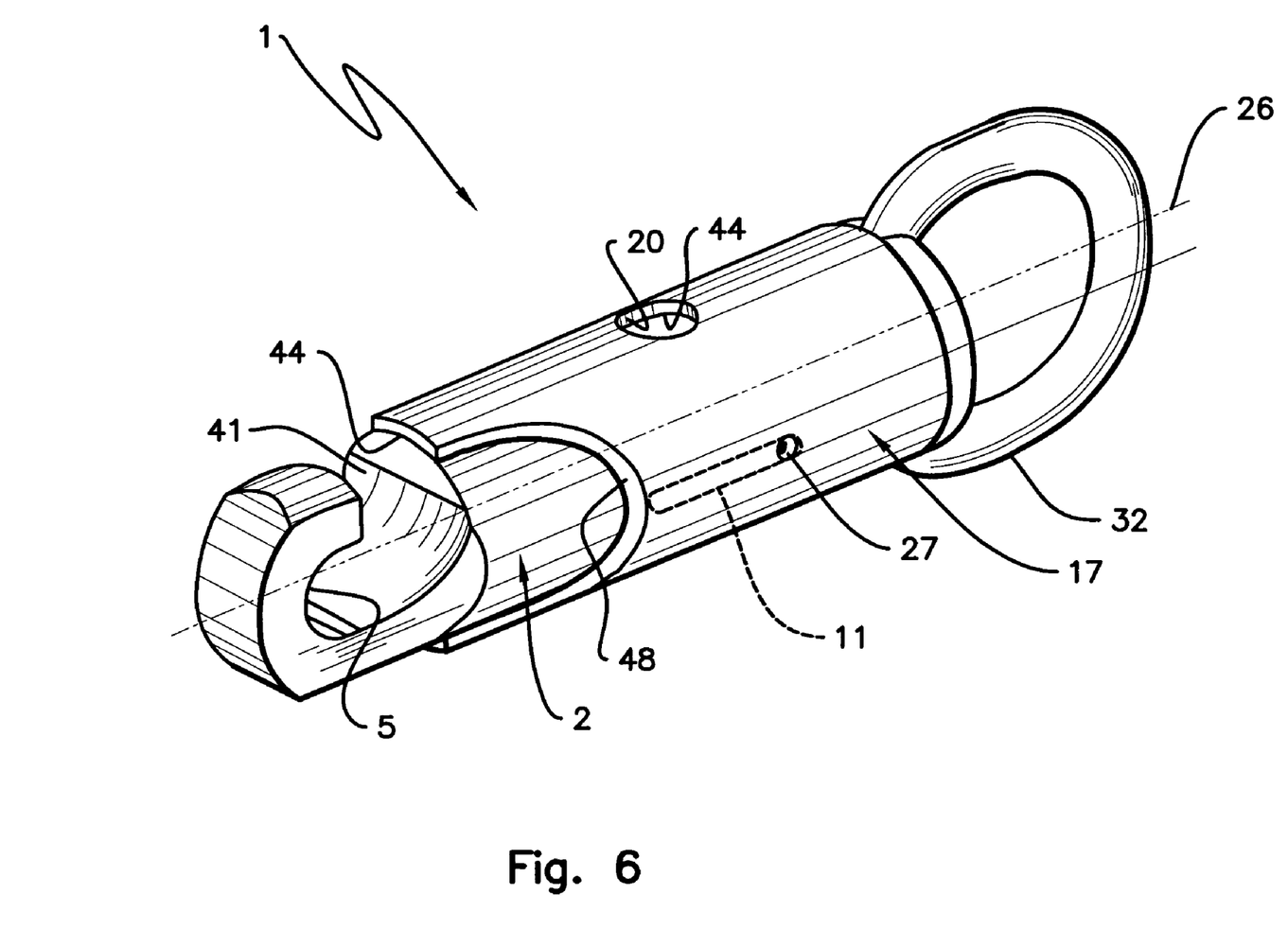
FIG. 6 shows the an enlarged isometric view of our invention in the open position with the sleeve slid up to uncover the hook opening.

As best be seen in FIG. 3, the hooked latch with ball lock sliding sleeve retainer presented as assembly 1 is shown in the locked position. In this position, the sleeve body 29 covers the hook opening 41, and balls 15 and 15' are partially engaged into holes 20 and 20' of sleeve 29, and hole 8 of body 2, thus locking sleeve 29 to body 2 from sliding. In this locked position, depression 27 is engaged in the lower end of slot 11, to prevent sleeve 29 from rotating when balls 15 and 15' are depressed to slide the sleeve 29 to the unlocked position. The sleeve 29 must slide a distance "x" to uncover the hook opening 41 as seen in FIG. 6.

Figure 4:
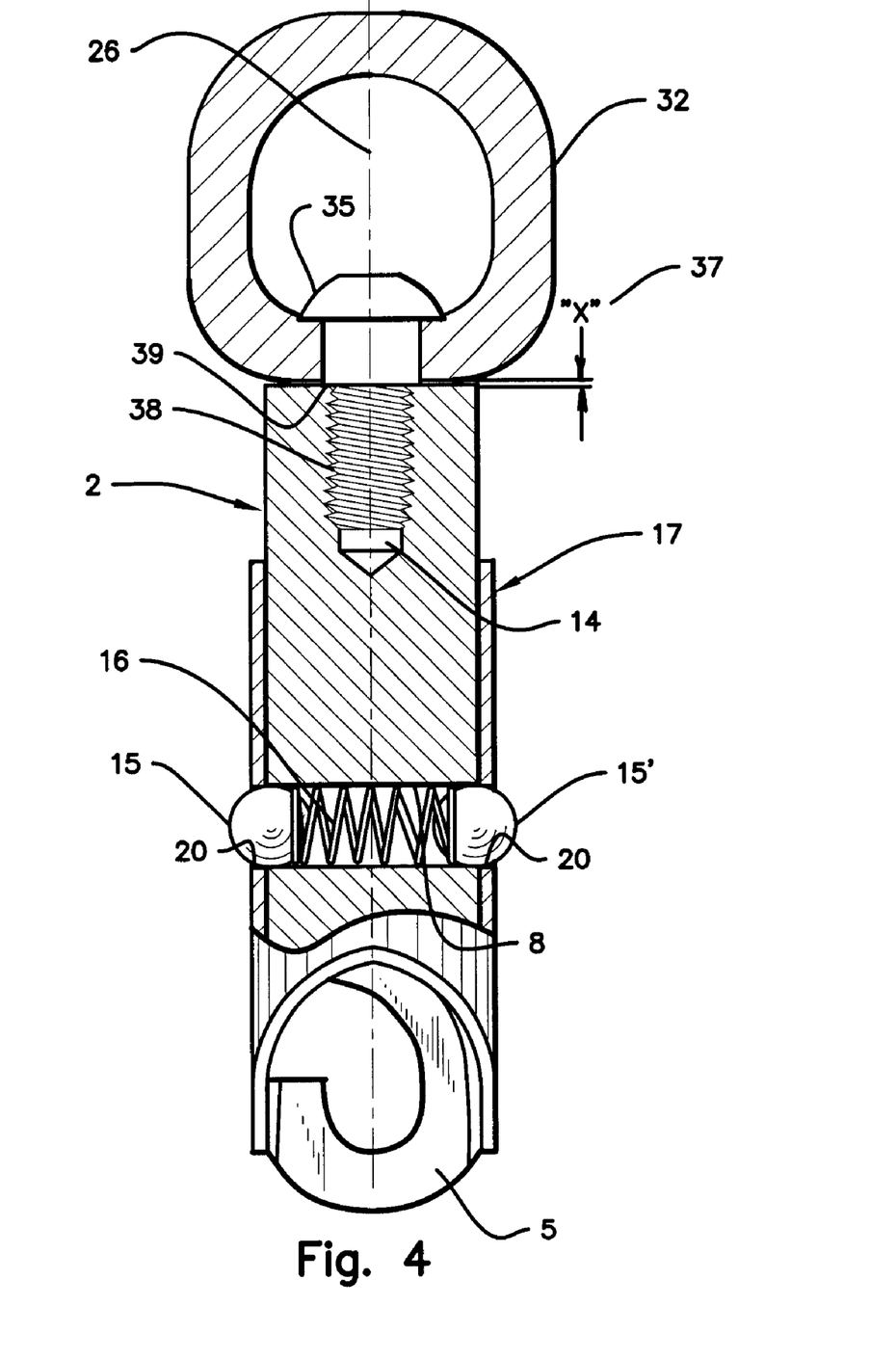
FIG. 4 is a front elevation view of the latch assembly with a partial section showing the spring loaded balls engaging the holes in the sleeve locking the sleeve in the closed position, and showing the bail attachment means with the shoulder bolt.

FIG. 4—Additional Embodiment

As best seen in FIG. 4, the latch is held in the closed position with locking balls 15 and 5'. This is accomplished with said compression spring 16 in hole 8 with balls 15 and 15' placed on each end of spring 16. The balls 15 and 15' are retained in said hole 8 by sliding said sleeve body 17 over said hook body 2 to align holes 20 and 20' over balls 15 and 15'. Holes 20 and 20' are designed to have a smaller diameter then the diameter of balls 15 and 15' thereby maintain said spring 16 in the compressed position, locking the balls 15 and 15' in holes 20 and 20' thus locking sleeve 17 to hook body 2 preventing the sleeve 17 from moving.

As best be seen in FIG. 4, said bail link 32 is attached to the hook body 2 with shoulder bolt 35 screwed into threaded hole 14 at end of hook body 2. The shoulder bolt 35 is torqued so that the bolt shoulder contacts the top face 39 of hook body 2 to producing a gap 37 to permit the bail 32 to rotate freely about the center line 26, thus to prevent twisting of cable 40 as best seen in FIG. 1.

Figures 5, 5A:
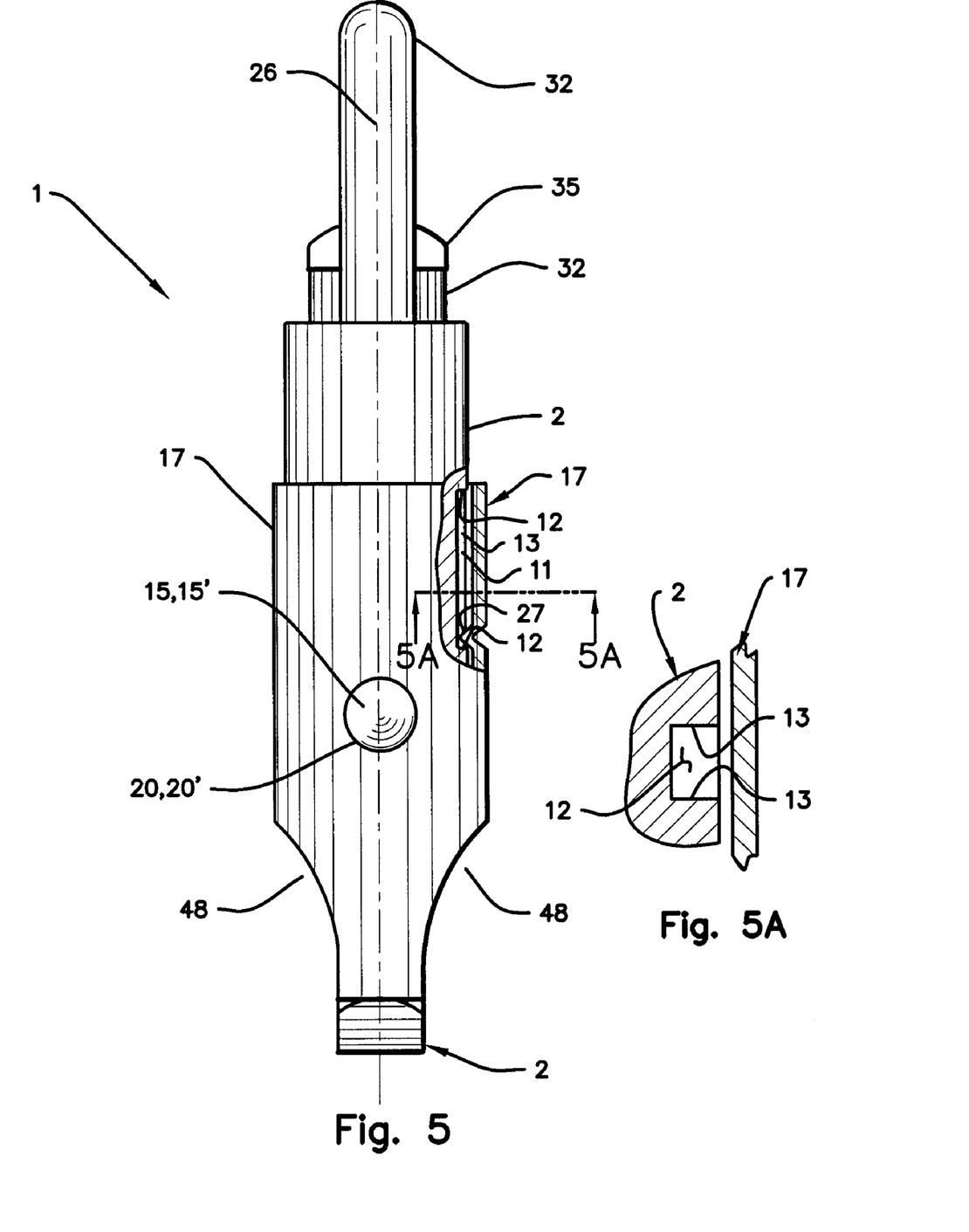
FIG. 5 is a left side elevation view of the latch assembly showing the position of the dimpled impression in the machined slot of the hook body with the sleeve in the closed position.

FIG. 5 and FIG. 5A—Further Embodiments

Best shown in FIG. 5, said latch assembly 1 is shown in the closed position with said dimple 27 depression shown retained and guided in slot 11. The dimple 27 depression is made with a punch to upset the metal into the slot 11 only after the latch assembly 1 is completed with balls 15 and 15' locked into holes 20 and 20'. This assembly procedure insures a permanent engagement between the hook body 2 and sliding sleeve 17, by preventing the sleeve 17 from sliding off the hook body 2. The dimple 27 is retained in slot 11 from sliding by the slot end surfaces 12.

With said dimple 27 depression is engaged in slot 11, sleeve body 29 is restrained from rotating about assembly centerline 26 by the slot sides 13 and dimple 27 depression shown in FIG. 5A.

FIG. 6—Assembly Embodiment In Unlocked and Open Position

With reference to FIG. 6, the hooked latch with ball lock sliding sleeve retainer presented as assembly 1 is shown in the unlocked open position. In this position, the balls 15 and 15' shown in FIG. 4 are depressed and held against the spring 16 force to permit the sleeve 29 to freely slide a distance "x"30 as shown in FIG. 3 to uncover the hook opening 41. Sleeve 29 is retained in this unlocked position by the friction force between the spring 16 loaded balls 15 and 15' pressing against the inner diameter 44 of sleeve 29. In this unlocked position dimple 27 depression is engaged in said upper end of slot 11 thus acting as a stop 46 preventing sleeve 29 from sliding further up, as well as preventing the sleeve 29 from rotating about the assembly centerline 26. Further the alignment of the sliding sleeve 17 with respect to hook body 2 is maintained assuring proper alignment of the balls 15 and 15' with holes 20 and 20'.

Figure 7:
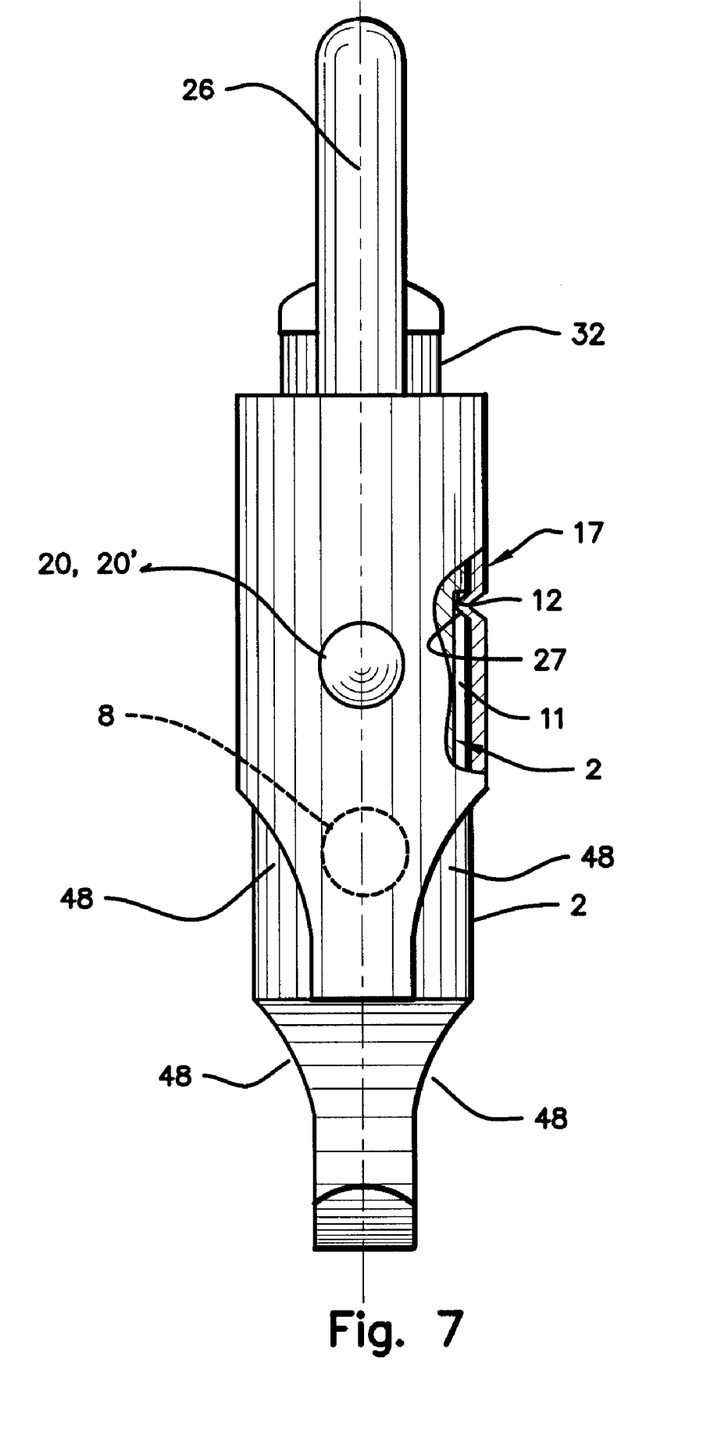
FIG. 7, is a left side elevation view of the latch assembly showing the position of the dimple impression in the machined slot of the hook body with the sleeve in the open position.

FIG. 7—Additional Embodiment

Best seen in FIG. 7, said latch assembly 1 is shown in the open position with said dimple 27 depression shown at the upper slot end surface 12 of slot 11. In this position the sliding sleeve 17 is restrained by the dimple 27 engaging slot end surface 12 from moving up and maintaining alignment of holes 20 and 20' with hole 8 in the hook body 2.

Advantages

From the description above, a number of advantages of our hook latch with ball lock sliding sleeve retainer become evident.

(a) The sliding sleeve 2 does not interfere with the cordage loop 4 when installing or removing the loop 4 from the hook opening 41.
(b) The indicated surfaces of the hook body 2 is scalloped 48 as shown in FIG. 7 to provide a smooth transition surface to avoid sharp corners and edges that will interference with the placing of the cordage loop 4 over the hook 5 when attaching cables.
(c) The body 2 of the latch assembly 1 were deliberately made long to allow for a good grip of the assembly 1 for ease of handling when attaching or removing the cordial loop 4.
(d) The sliding movement of sleeve 29 to uncover or to cover the hook opening 41 is independent of the load on the cordage loop 3 or cordage loop 4.
(e) The sleeve 29 is maintained in its position by friction between locking balls 15 an 15' permitting the operator ease of attaching or removing the cordage loop 4.
(f) The latch assembly 1 is permitted to swivel freely about the bail link 32 prevent twisting of the cordage loop 3 and cordage loop 4 during operation of the assembly 1.
(g) The ball lock coupled with the slot and detent arrangement precludes the sleeve 29 from uncovering the hook opening 41 when in use.

Operation

The manner of operating our hook latch with the ball sliding sleeve retainer has two positions. In position one, sleeve 29 is placed in the full up position with the top of the sleeve 29 flush with the top of the hook body 1. In this position the hook opening 41 is uncovered, and a cordage loop 4 is placed over the hook. In position two the sleeve is slid down to a position until the locking balls 15 and 15' automatically snaps into the holes 20 and 20' to cover the hook opening 41 and lock the sleeve 29 in position.

To raise the sleeve the two balls 15 and 15' are depressed simultaneously while raising the sleeve to uncover the hook opening.

Conclusion, Ramification, and Scope

While a preferred form of the invention has been shown in the drawings and described, since variations in the preferred form will be apparent to those skilled in the art, the invention should not be construed as limited to the specific form shown and described, but instead is as set forth in the following claims. Thus the scope of the invention should be determined by the appended claims and their legal equivalents, rather than by the example given.

We claim:

1. A hook latch of the type comprising a center body with said hook having a sliding sleeve retainer thereof wherein said hook is formed integral with said center body, and a hole extends through one side to the opposite side perpendicular to the axis of said center body and a spring loaded balls disposed within said hole for locking said sliding sleeve to said hook body therein.

2. The hook latch as recited in claim 1 wherein the center body is composed of a solid ferrous or non-ferrous material, (a) The center body wherein a hook is formed by scalloped faces at opposite sides of said hook,
  (b) The center body wherein said body is cylindrical.

3. The hook latch as recited in claim 1 wherein the sliding sleeve retainer is composed of a solid ferrous or non-ferrous cylindrical tube, (a) The sliding sleeve retainer wherein scalloped ends are formed at opposite faces on one end of the cylindrical tube,
  (b) The sliding sleeve retainer wherein said holes are formed coaxial to one another and perpendicular to the center line of the cylindrical tube positioned at the center of the cylindrical tube,
  (c) The sliding sleeve retainer wherein a dimple is positioned and formed only after assembly of the hook latch.

4. The hooked latch as recited in claim 1 wherein the balls are composed of a solid ferrous or non-ferrous material, (a) The spring-loaded balls wherein the balls lock the center body to said sliding sleeve through the coaxial holes in said sleeve.

* * * * *